3,535,117
METHOD OF PREPARING A SOUR MILK BEVERAGE

Yoshitada Yamanaka and Shinji Okumura, Tokyo, Koji Mitsugi, Yokohama-shi, and Yoshisuke Hasegawa, Kawasaki-shi, Japan, assignors to Ajinomoto Co., Inc., Tokyo, Japan
No Drawing. Filed Apr. 2, 1968, Ser. No. 718,236
Claims priority, application Japan, Apr. 12, 1967, 42/23,272
Int. Cl. A23c 9/12, 11/00, 17/00
U.S. Cl. 99—59                                4 Claims

ABSTRACT OF THE DISCLOSURE

A sour milk beverage having the consistency and taste of buttermilk (sour milk) or yoghurt is prepared by fermentation of an aqueous dispersion of skim milk solids and soybean protein containing certain amino acids by lactic acid bacteria. The amino acids modify the fermentation process in such a manner as to suppress the soybean flavor which otherwise mars the taste of the fermentation product.

---

This invention relates to the preparation of sour milk beverages, such as buttermilk (sour milk) or yoghurt.

The milk beverages of the type with which this invention is concerned were produced heretofore from cow's milk products, such as whole milk, skim milk, evaporated skim milk, or condensed milk, by fermentation with lactic acid bacteria.

The milk protein, which is the principal solid ingredient of conventional sour milk beverages, is relatively costly and is in short supply in many countries. Soybean protein is much cheaper and in ample supply wherever soybeans are a source of food. Attempts were therefore made prior to this invention to substitute soybean protein for milk protein in fermentation mixtures from which sour milk beverages were prepared. The soybean flavor of the beverages prepared heretofore is not acceptable, however, if a significant portion of the milk protein is replaced by soybean protein. Sour milk beverages containing soybean protein did not find commercial acceptance heretofore.

It has now been found that one half or more of the protein in a sour milk beverage may be derived from soybeans if the fermentation of an aqueous dispersion of the soybeans and milk proteins is carried out in the presence of relatively small, but effective amounts of certain amino acids.

The amounts of free amino acids present in skim milk solids or commercial soybean protein products are minute, usually less than 0.01% by weight. The lactic acid bacteria normally used for converting the dispersion into a sour milk beverage do not produce effective proteases, and thus do not form significant amounts of free amino acids during fermentation.

While we have not yet precisely determined the mechanism by which amino acids added to the fermentation medium according to the invention suppress the soybean flavor, there is evidence indicating that either the bacterial metabolism is being modified by the presence of the added amino acids, or that keto acids are formed by the deaminase of the lactic acid bacteria from the amino acids. The keto-acids or their decarboxylation products may either mask the soybean flavor or react with the components causing the flavor to form odorless or otherwise innocuous reaction products.

The amino acids which have been found to suppress the soybean flavor when present in the fermentation medium in effective amounts are proline, alanine, lysine, glutamic acid, methionine, arginine, and aspartic acid in the respective L-forms, and glycine. Best results are generally achieved at concentrations of 0.1 to 1.0 g. per liter. At higher concentrations, the amino acids also suppress the soybean flavor, but add their own taste to the product which is distinctly different from that of sour milk beverages produced from cow's milk alone.

The fermentation medium of the invention, which contains free amino acids, should be sterilized at low temperature, and the soybean flavor is suppressed most effectively when the pH of the fermentation medium is initially adjusted to 5.6 to 6.0.

The various sources of milk protein enumerated above may be employed in the method of the invention together with soybean protein free from significant amounts of oil, but otherwise in any desired shape or state. The products most readily available are the water soluble proteins extracted from the fat- and oil-free residue of soybeans or dehydrated soybean protein. A refined commercial soybean protein normally is preferred over a cruder product.

The normal procedures of the dairy art are followed otherwise in preparing the sour milk beverages of the invention. The specific strains of microorganisms employed appear not to be critical, and substantially the same results were obtained with different microorganisms now being employed in the manufacture of yoghurt and other sour milk beverages.

The following examples further illustrate the method of the invention:

EXAMPLE 1

*Lactobacillus bulgaricus* and *Streptococcus thermophilus* were cultured at 37° C. for 18 hours on respective batches of an aqueous medium containing 10% dispersed skim milk solids. The two broths so obtained were mixed, and a portion of the mixture was added to the main fermentation medium of the following composition:

|  | G. |
|---|---|
| Skim milk solids | 30 |
| Water soluble soy bean protein | 42 |
| Sucrose | 26 |
| Artificial sweetener (cyclamate) | 0.566 |
| Mixed amino acids | 0.2 |

8.2 N citric acid solution to pH 5.8.
Deionized water to 388 ml.

The soybean protein employed was a commercial product prepared by extraction of defatted soybean flakes with water, and evaporation of the extract to dryness. The amino acid mixture was prepared from 3.5 g. L-alanine, 3.7 g. L-arginine, 2.5 g. L-aspartic acid, 34. g. sodium L-glutamate, 7.5 g. glycine, 6.0 g. L-lysine, and 5.0 g. L-methionine.

The solid ingredients were dispersed in about ¾ of the water ultimately used, whereupon the pH of the dispersion was adjusted by means of the citric acid solution, and the balance of the water was added to the desired volume. The liquid medium was sterilized at 60°–65° C. for 30 minutes, cooled to 37° C., and mixed with an artificial flavoring agent to give it a raspberry flavor.

The fermentation medium was inoculated with 12 ml. of the afore-mentioned mixed broths, kept at 31° C. for 6 hours, and thereafter stored in a domestic refrigerator for 24 hours.

The product obtained had the consistency and taste of conventional yoghurt, having an acidity of 1.07 (total acid 1.27) and a hardness of 37 g. A control sample was prepared in the same manner from a fermentation medium not containing the amino acid mixture, but otherwise as described above.

Unidentified samples of the two products were submitted to a panel of 47 experienced tasters. 45 panel members considered the yoghurt prepared with amino acids superior to the control, free from noticeable soybean flavor, and equivalent in taste and flavor to ordinary yoghurt prepared from cow's milk.

EXAMPLE 2

A fermentation medium was prepared from 42 g. evaporated skim milk (skim milk solids), 30 g. water-soluble soybean protein, 0.2 g. L-proline dissolved in deionized water, adjusted to pH 5.7 with 72% lactic acid, and diluted to an ultimate volume of 388 ml. The medium was sterilized at 60–65° C. for 30 minutes, cooled to 37° C. and inoculated with 12 ml. of the mixed broths prepared in Example 1.

After 11.5 hours at 37° C., a curd having a total acidity of 2.02 (pH 3.7) was obtained. It was recovered, crushed in a mixer, and mixed with 100 g. of an aqueous solution containing 72% sucrose and 1% artifiical sweetener. To each kilogram of the sweetened solution so obtained, there were further added 15.5 ml. of an aqueous solution of which 100 ml. contained 19 ml. 75% lactic acid. 2.5 g. citric acid, 3.2 g. malic acid, and 2.6 g. tartaric acid. Fruit flavoring also was added.

The homogeneous mixture produced was put in cold storage for two months without developing a precipitate. Its acidity then was 1.40 (pH 3.85). It was diluted with three volumes of water and submitted to a panel of tasters for comparison tests with sour cow's milk. The 38 members of the panel were unanimous in noting the absence of a soybean flavor in the product of the invention, and could not find a significant difference between the product of the invention and ordinary sour cow's milk.

EXAMPLE 3

A fermentation medium was prepared as in Example 1, but the mixed amino acids were replaced by 0.12 g. proline and 0.2 g. L-alanine. The medium was inoculated with the mixed culture broths as in Example 1, fermented at 37° C. for six hours, and then stored in a refrigerator for 24 hours.

The yoghurt so obtained had an acidity of 0.82 produced by fermentation (total acid 1.00) and 35 g. hardness. Of 32 members of a tasting panel, 30 members could not detect a soybean flavor and considered the product equivalent to yoghurt prepared from cow's milk alone.

While L-proline is particularly beneficial in causing removal of the soybean flavor from the ultimate product, mixtures of the several amino acids referred to in Example 1 which are free from proline have also been found effective. The concentration of the amino acid or acids in the fermentation medium should not be less than 0.01% (0.1 g. per liter), and amino acid concentrations higher than 0.1% (1 g. per liter) are to be avoided.

The amino acids are most beneficial in a fermentation medium having a pH of 5.6 to 6.0, and should not be subjected to sterilization at a temperature significantly higher than 65° C.

What is claimed is:

1. In a method of preparing a sour milk beverage by fermentation of an aqueous dispersion of skim milk solids and soybean protein, the improvement in the fermentation medium which comprises adding to said dispersion prior to the fermentation an amino acid selected from the group consisting of L-proline, glycine, L-alanine, L-lysine, L-glutamic acid, L-methionine, L-arginine, and L-aspartic, the amount of said amino acid being sufficient substantially to suppress soybean flavor in said beverage without imparting the own taste, thereof to the beverage, and the amount of said soybean protein being sufficient to impart a distinct soybean flavor to the beverage in the absence of said amino acid during said fermentation.

2. In a method as set forth in claim 1, said amino acid being added to said dispersion in an amount of 0.1 to 1 gram per liter.

3. In a method as set forth in claim 1, the pH of said dispersion containing said amino acid being adjusted to 5.6–6.0, and the adjusted dispersion being sterilized at a temperature of 60°–65° C. for not substantially less than 30 minutes prior to said fermentation.

4. In a method as set forth in claim 1, said soybean protein constituting not substantially less than one half of the total protein present in said dispersion.

References Cited

UNITED STATES PATENTS

| 2,344,229 | 3/1944 | Block et al. | 99—14 X |
|---|---|---|---|
| 2,650,166 | 8/1953 | Tinkler et al. | 99—57 |
| 3,096,177 | 7/1963 | Ariyama | 99—59 |
| 3,415,655 | 12/1968 | Hino et al. | 99—54 |

LIONEL M. SHAPIRO, Primary Examiner

D. M. NAFF, Assistant Examiner

U.S. Cl. X.R.

99—64, 98